United States Patent
Chiba (10) Patent No.: US 7,185,264 B2
(45) Date of Patent: Feb. 27, 2007

(54) IMAGE PROCESSING APPARATUS AND METHOD THEREFOR

(75) Inventor: Yukio Chiba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 10/642,231

(22) Filed: Aug. 18, 2003

(65) Prior Publication Data

US 2004/0107399 A1 Jun. 3, 2004

(30) Foreign Application Priority Data

Aug. 20, 2002 (JP) ............................. 2002-239784
Aug. 8, 2003 (JP) ............................. 2003-290722

(51) Int. Cl.
*G11C 29/00* (2006.01)

(52) U.S. Cl. ...................... 714/768; 386/113; 386/124; 382/246

(58) Field of Classification Search ................ 714/758, 714/768, 747, 764, 775, 789; 386/113, 116, 386/124; 382/246; 370/503, 510, 513; 375/240.28

See application file for complete search history.

(56) References Cited

U.S. PATENT DOCUMENTS

| | | | |
|---|---|---|---|
| 5,815,635 A * | 9/1998 | Seoh | 386/113 |
| 6,603,413 B2 | 8/2003 | Igarashi et al. | 341/67 |
| 2002/0090142 A1 | 7/2002 | Igarashi et al. | 382/246 |
| 2002/0122599 A1 | 9/2002 | Igarashi et al. | 382/239 |
| 2002/0164080 A1 | 11/2002 | Igarashi et al. | 382/233 |
| 2003/0058143 A1 | 3/2003 | Chiba et al. | 341/67 |
| 2003/0118240 A1 | 6/2003 | Satoh et al. | 382/239 |

* cited by examiner

*Primary Examiner*—Guy J. Lamarre
(74) *Attorney, Agent, or Firm*—Fitzpatrick, Cella, Harper & Scinto

(57) ABSTRACT

For always executing an efficient and appropriate error compensation process and improving the convenience of the user, an image processing apparatus and a method enters encoded image data including a marker code for a resynchronizing process within one picture, detects a code error in the encoded image data, and discriminates whether or not to execute an error compensation process utilizing the marker code according to a result of the detection and an attribute of the encoded image data.

14 Claims, 10 Drawing Sheets

FIG. 9

IMAGE PROCESSING APPARATUS AND METHOD THEREFOR

BACKGROUND OF THE INVENTION

1. Field of the Invention

The present invention relates to an image processing apparatus provided with an error compensation process and a method therefor, adapted for use in an apparatus or a system for encoding/decoding image information.

2. Related Background Art

As an encoding method for storing and displaying a still image in an accumulating medium (recording medium) such as a CD-ROM or a hard disk, there has been widely employed a JPEG (Joint Photographic Expert Group) method standardized by ISO (International Organization for Standardization). On the other hand, for storing and displaying a moving image like the still image, or for broadcasting or bidirectional communication through a communication channel, there has been widely employed an MPEG (Moving Picture Expert Group) method standardized by ISO.

In the encoding of image information with either of the JPEG method and the MPEG method, there is generated an encoded data train constituted of a header portion including information necessary for decoding the image, such as an image size, a number of color components constituting the image, a sampling coefficient for each color component etc., and an image data portion which is entropy encoded by a variable length code.

The present invention is applicable to both a still image and a moving image, but there will be explained hereinafter an encoding and a decoding of a still image for the purpose of simplicity.

At first, in case of encoding a still image by a block interleave method in which a color component is encoded repeatedly for each block of 8×8 pixels, a minimum unit for encoding blocks of all the color components on the basis of a sampling coefficient is called "minimum coding unit (MCU)".

For example, in case a color image is constituted of a luminance component Y and color difference components Cb, Cr and has a sampling ratio of 2:1:1 in the horizontal direction and 1:1:1 in the vertical direction, 1 MCU is composed of 4 blocks of (Y, Y, Cb, Cr).

It is also possible, in the encoded data train, to insert an identifier, called restart marker (resynchronizing identifier), at an arbitrary period on the MCU basis. By utilizing such restart marker, it is possible, in decoding an encoded data train including an error for some reason, to suppress an influence of such error at the period of the restart marker.

It is stipulated that the aforementioned restart marker is positioned at a boundary of bytes in the encoded data train. Therefore, in case the encoded data train immediately before the insertion of the restart marker is not terminated at a boundary of a byte, the restart marker is inserted after insertion of successive "1"s of 1 to 7 bits, called padding bits.

In case of decoding an encoded data train including a code error for some reason, such error is mostly detected by either of following phenomena (1) and (2):

(1) detection of a variable length code not existing in a conversion table utilized in the decoding; and
(2) detection of variable length codes more than 64 within a block.

In case restart markers are inserted in the encoded data train, it is possible to execute a search on the encoded data train after a position where a code error is detected and to re-start the decoding from a position where a restart marker is present.

For undecodable encoded data present between the position of detection of the code error and the position where the restart marker is present, there are inserted compensation data to obtain a reproduced image which coincides, in a number of the horizontal pixels and in a number of the vertical pixels, with an original image.

Also, even in case a restart marker is not present in the encoded data train after the position where the code error is detected, there may be inserted compensation data so as to meet the number of the horizontal pixels and the number of the vertical pixels of the original image, thereby enabling to display at least a part of the image before the detection of the code error.

However, in the aforementioned conventional image processing method for decoding encoded image data, a process of executing a search of the restart marker on the encoded data train from the position of detection of the code error and inserting compensation data (error compensation (error repair) process) is an exceptional process and is not executed in the decoding of an ordinary encoded data train not including the code error.

For this reason, the error compensation process is generally not realized by a hardware but realized by a software on a microprocessor in consideration of the cost. However, in terms of the process speed, it cannot be denied that a process by a software requires a longer process time than a process by a hardware.

On the other hand, in case a coder error is once detected in an encoded data train constituted as continuous variable length codes, the only way to understand a level of code errors in the entire encoded data train is to inspect successively the encoded data train after the position where the code error is detected.

Therefore, in case many code errors exist in dispersing manner in a large-size image, there are repeated four processes of a code error detection, a search for a restart marker, a compensation process, and a restarting of decoding. Among these processes, the search for the restart marker and the compensation process, which are generally realized by a software, need a major part of the process time required for the entire decoding. As a result, there is required an extremely longer process time than in the ordinary decoding.

However, in an application in which priority is given to a formation of a reconstructed image faithful to the original image, the above-described compensation process is adopted positively even if a longer process time than in the ordinary decoding process is required. For example, in the decoding process of a still image, the error compensation process is generally adopted since priority is often given to a formation of a reproduced image faithful to the original image.

On the other hand, in an application in which priority is given to completion of the decoding process within a shorter time, it is desired to complete the process within a process time similar to that in the ordinary decoding process.

For example, in a moving image decoding process, the process time permitted for the decoding process is limited since it is required to decode, within 1 second, about 30 images in succession. Also in case of decoding and displaying a moving image, a visual defect to the user is limited even in case one of the consecutive plural images contains certain code errors. Furthermore, even in case one of the consecutive plural images is not usable because of code errors, it is possible to interpolate such image from images positioned time-sequentially close.

Therefore, even in case an encoded data train includes a code error, it is reasonable that the error compensation process is completed within a process time comparable to that in the ordinary decoding process.

However, there has not been a configuration that can satisfy the mutually contradictory requirements for the error compensation (error concealment) process in the aforementioned two different situations, whereby the convenience of the user is significantly impaired.

SUMMARY OF THE INVENTION

In consideration of the foregoing, an object of the present invention is to provide an image processing apparatus and an image processing method having a configuration capable of adaptively executing an error correcting process in which priority is given to a formation of a reproduced image faithful to an original image and an error correcting process which is completed within a process time comparable to that in an ordinary decoding process, according to a purpose of the decoding process for a still image or a moving image including a code error, thereby always achieving an efficient and appropriate error correction process and improving the convenience of the user.

Such object can be attained, according to an aspect of the present invention, by an image processing apparatus including an input unit arranged to input encoded image data in which attached is a marker code for a resynchronizing process within one picture, a detection unit arranged to detecte a code error in the encoded image data, and an error process unit arranged to execute an error correcting process on the encoded image data according to a result of detection by the detection unit, wherein the error process unit judges whether or not to execute the error correcting process utilizing the marker code, according to an attribute of the encoded image data.

Also in accordance with an aspect of the present invention, an image processing method comprises an input step of inputting encoded image data in which attached is a marker code for a resynchronizing process within an image, a detection step of detecting a code error in the encoded image data, and an error process step of executing an error correcting process on the encoded image data according to a result of detection in the detection step, wherein the error process step judges whether or not to execute the error correcting process utilizing the marker code, according to an attribute of the encoded image data.

Other objects, features and advantages of the invention will become apparent from the following detailed description taken in conjunction with the accompanying drawings.

DESCRIPTION OF THE PREFERRED EMBODIMENTS

In the following, the present invention will be explained by embodiments thereof with reference to the accompanying drawings.

Figure 1:
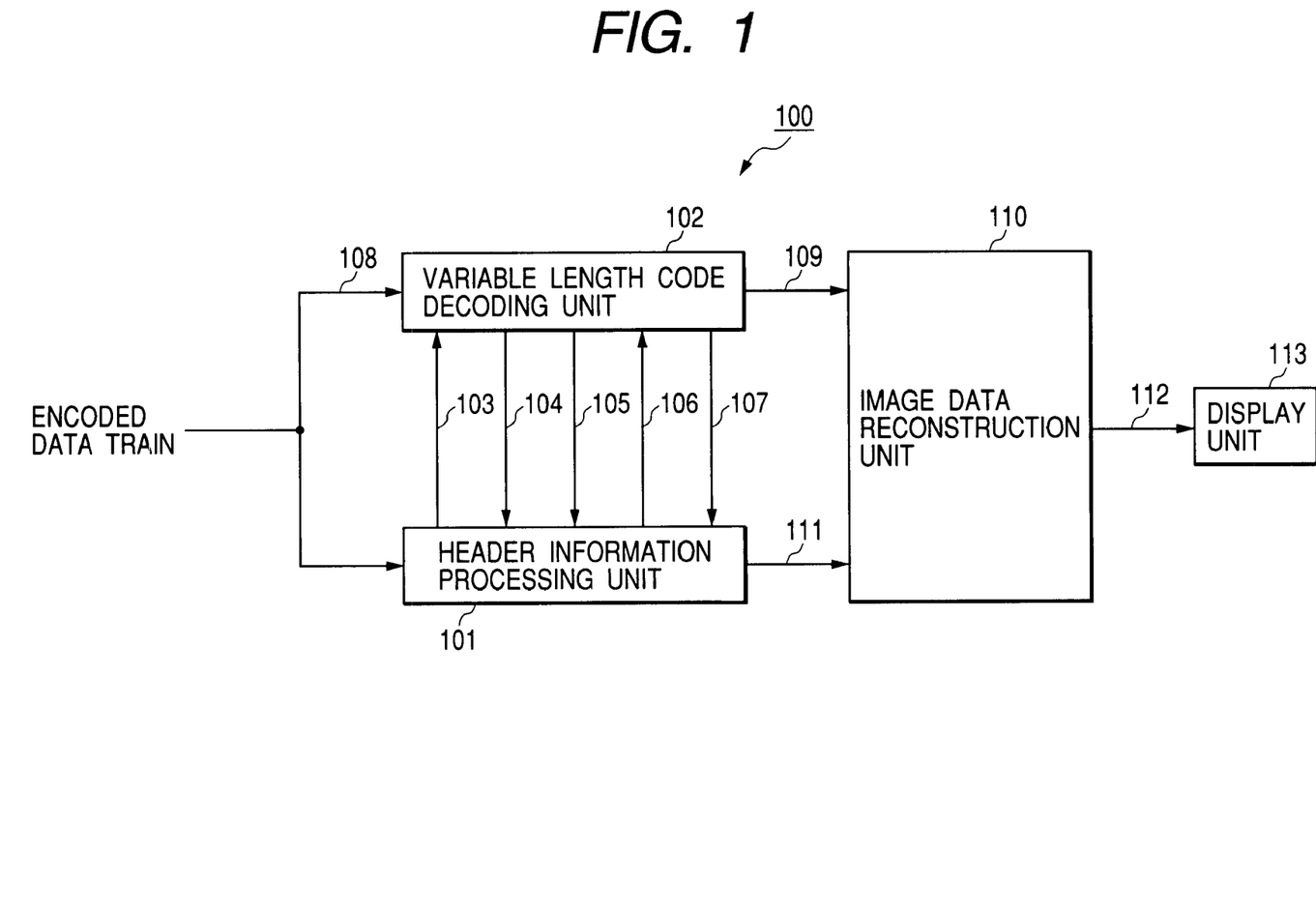
FIG. 1 is a block diagram showing a configuration of an image processing apparatus embodying the present invention.

The present invention is applicable for example to an image processing apparatus 100 as shown in FIG. 1.

The image processing apparatus 100 of the present embodiment has a function of encoding/decoding image information of a still image or a moving image, and is so constructed to execute an adaptive error compensation (error correction) process on an encoded data train including a code error, particularly according to a utilization purpose of a decoding process on the encoded data train of image information.

In the following, there will be given a detailed description on the configuration and the function of the image processing apparatus 100 of the present embodiment.

Configuration of Image Processing Apparatus 100

As shown in FIG. 1, the image processing apparatus 100 is provided with a header information processing unit 101, a variable length code decoding unit 102, an image data reconstruction unit 110, and a display unit 113. The display unit 113 may also be constructed as an external apparatus which can be connected to the image processing apparatus 100.

The header information processing unit 101 has a function of a microprocessor provided with an input/output interface with the exterior and executes a predetermined operation by executing a predetermined processing program by a CPU thereof.

The header information processing unit 101 receives an encoded data train 108 to be processed, and also receives an operation completion signal 104, a code error detection signal 105 and an encoded data output signal from the variable length decoding unit 102.

The variable length decoding unit 102 receives an encoded data train 108 to be processed, and also receives an operation start instruction signal 103 and a compensation data write signal 106 from the header information processing unit 101.

The image data reconstruction unit 110 receives a set of orthogonal transformation coefficient sequence output signals 109 and an encoding parameter output signal 111, and outputs reconstructed image data 112, which are displayed on the display unit 113.

Operation of Image Processing Apparatus 100

Figure 2:
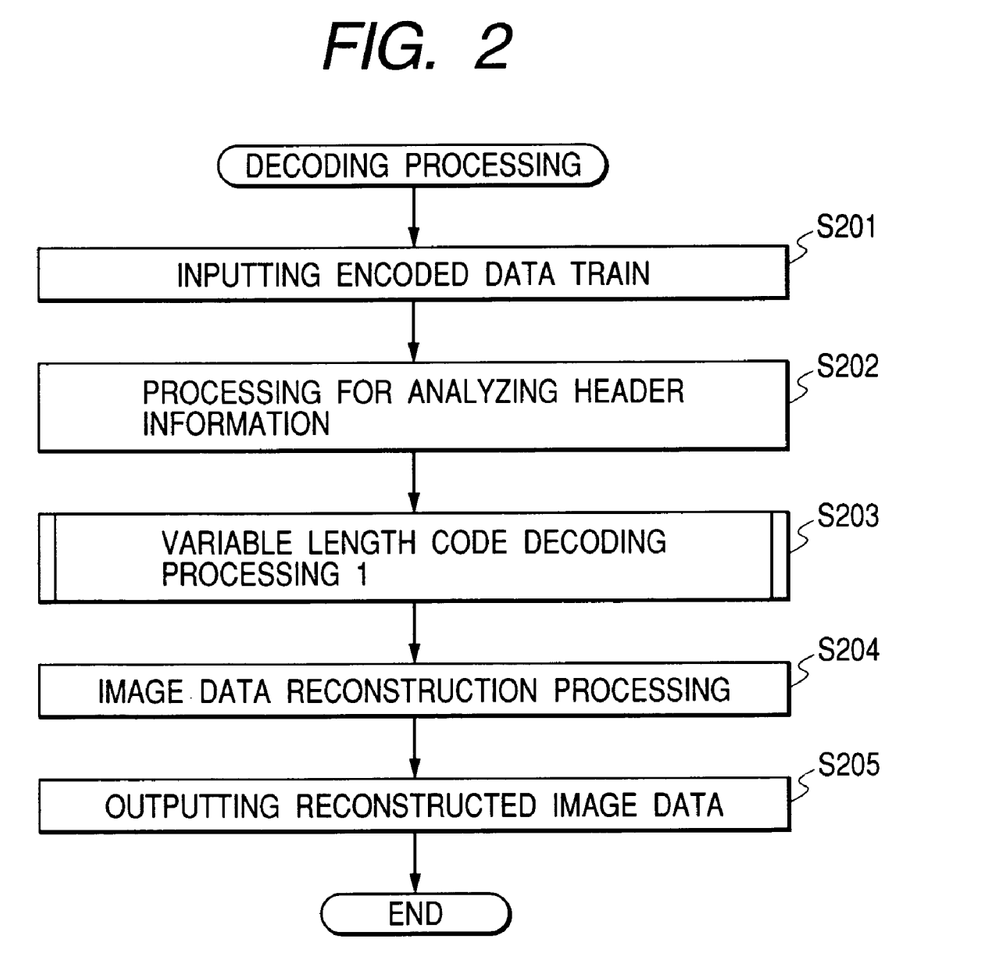
FIG. 2 is a flow chart showing a decoding process in an image processing apparatus 100.

At first, an entire decoding process in the image processing apparatus 100 will be explained with reference to a flow chart shown in FIG. 2.

In the image processing apparatus 100 (cf. FIG. 1), an inputted encoded data train 108 to be processed is supplied respectively to the header information processing unit 101 and the variable length code decoding unit 102 (step S201).

Then the header information processing unit 101, for example by executing an internal program by a CPU, reads a header information contained in the encoded data train 108 and analyzes the content of this header information thereby acquiring an encoding parameter 111, and outputs this encoding parameter 111 to the image data reconstruction unit 110 (step S202).

Then the header information processing unit 101 executes a variable length code decoding process 1 (step S203). The details of the variable length code decoding process 1 will be explained later.

After the process of the step S203, the image data reconstruction unit 110 executes, on significant coefficients contained in an orthogonal transformation coefficient sequence (orthogonal transformation coefficient sequence output signals 109) from the variable length code decoding unit 102, a scaler inverse quantization based on a quantizing step value (encoding parameter output signal 111) separately designated from the header information processing unit 101, thereby restoring the orthogonal transformation coefficients arranged in a one-dimensional data train in a predetermined order, to a two-dimensional arrangement, and executes an inverse orthogonal transformation calculation in the unit of a block, thereby restoring reconstructed image data of a rectangular block (step S204).

The reconstructed image data restored in the step S204 are outputted as a reconstructed image data output signal 112 (step S205).

Explanation on Variable Length Code Decoding Process 1

In the following there will be explained, with reference to a flow chart shown in FIG. 3, a variable length code decoding process 1 by the header information processing unit 101 in the step S203 shown in FIG. 2.

In the beginning, the header information processing unit 101 stores, in an internal register or an internal memory, a code amount count value indicating an unprocessed code amount with respect to a total code amount to be decoded.

Thus, the header information processing unit 101, prior to the start of the decoding process by the variable length code decoding unit 102, sets a total code amount to be decoded, as the code amount count value (step S301).

Then, in case a succeeding code is image information, namely consecutive plural variable length codes obtained by executing a variable length encoding process on a sequence of orthogonal transformation coefficients, the header information processing unit 101 issues an operation start designation signal 103 for a variable length code decoding process 2 to the variable length code decoding unit 102 (step S302). The details of the variable length code decoding process 2 in the variable length code decoding unit 2 will be explained later.

Then, when the variable length code decoding process 2 is executed by the variable length code decoding unit 102 and a code error detection information signal 105 indicating a detection of a code error is received by the header information processing unit 101 (step S303), it executes a compensation method determining process for determining a compensation method (data compensation process) to be employed (step S304). The details of the compensation method determining process will be explained later.

Then, after the compensation method determining process in the step S304, the header information processing unit 101 refers to a resynchronization process execution flag, and, in case it is set at a value "0" (step S305), a compensation data output process is immediately executed (step S306). The details of the compensation data output process will be explained later.

In case the step S303 does not receive the code error detection signal 105 and in case the header information processing unit 101 receives an operation completion informing signal 104 indicating the completion of the variable length code decoding process 2 from the variable length code decoding unit 102 (step S310), the process flow is terminated.

In case the step S310 does not receive the operation completion informing signal 104, the flow returns to the step S303.

When in the step S305, the header information processing unit 101 refers to the resynchronization process execution flag and it is set at a value "1", the header information processing unit 101 acquires a value of the code amount already decoded from the variable length code decoding unit 102, and subtracts the already decoded code amount value from the code amount count value, thereby counting a code amount of the unprocessed encoded data train (step S307).

Then in case the encoded data train 108 to be compensated is encoded by the JPEG method, the header information processing unit 103 executes a resynchronization process utilizing a restart marker (step S308). The details of the resynchronization process will be explained later.

After the resynchronization process in the step S308, the operation start designation signal 103 instructs the variable length code decoding unit 102 to again start the variable length code decoding process 2 (step S309).

Thereafter, in case a code error is detected again, the header information processing unit 101 repeats the above-described process flow, but, in case a code error is not detected, there is waited the completion of the variable length code decoding process 2 of all the encoded data train 108 by the variable length code decoding unit 102, and the process flow is terminated in response to this completion (step S310).

Explanation on Variable Length Code Decoding Process

In the following there will be explained, with reference to a flow chart shown in FIG. 4, a process operation of the variable length code decoding unit 102 in response to the operation start designation signal 103 for the variable length code decoding process 2 in the step S302 or S309 in FIG. 3.

At first the variable length code decoding unit 102, upon receiving the operation start designation signal 103 from the header information processing unit 102 (step S401), reads out in succession continuous plural variable length codes from the encoded data train 108, then converts each variable length code into a corresponding orthogonal transformation coefficient by referring to a separately provided variable length code table, and outputs thus obtained sequence of the orthogonal transformation coefficients as orthogonal transformation coefficient sequence output signals 109 in succession to the image data reconstruction unit 110 (step S402).

In this operation, an encoding parameter, represented by a quantizing step value, is separately supplied in succession as an encoding parameter output signal 111 from the header information processing unit 101 to the image data reconstruction unit 110.

Then, in case a code error is not detected (step S403), the variable length code decoding unit 102 executes a variable length code decoding process on the encoded data train 108, and, upon completing this variable length code decoding process (step S404), outputs an operation completion informing signal 104 for informing the process completion to the header information processing unit 101 (step S405).

On the other hand, in case a code error is detected in the step S403, a code error detection signal 105 indicating a detection of a code error is outputted to the header information processing unit 101 (step S406).

Explanation on Compensation Method Determining Process

Figure 5:
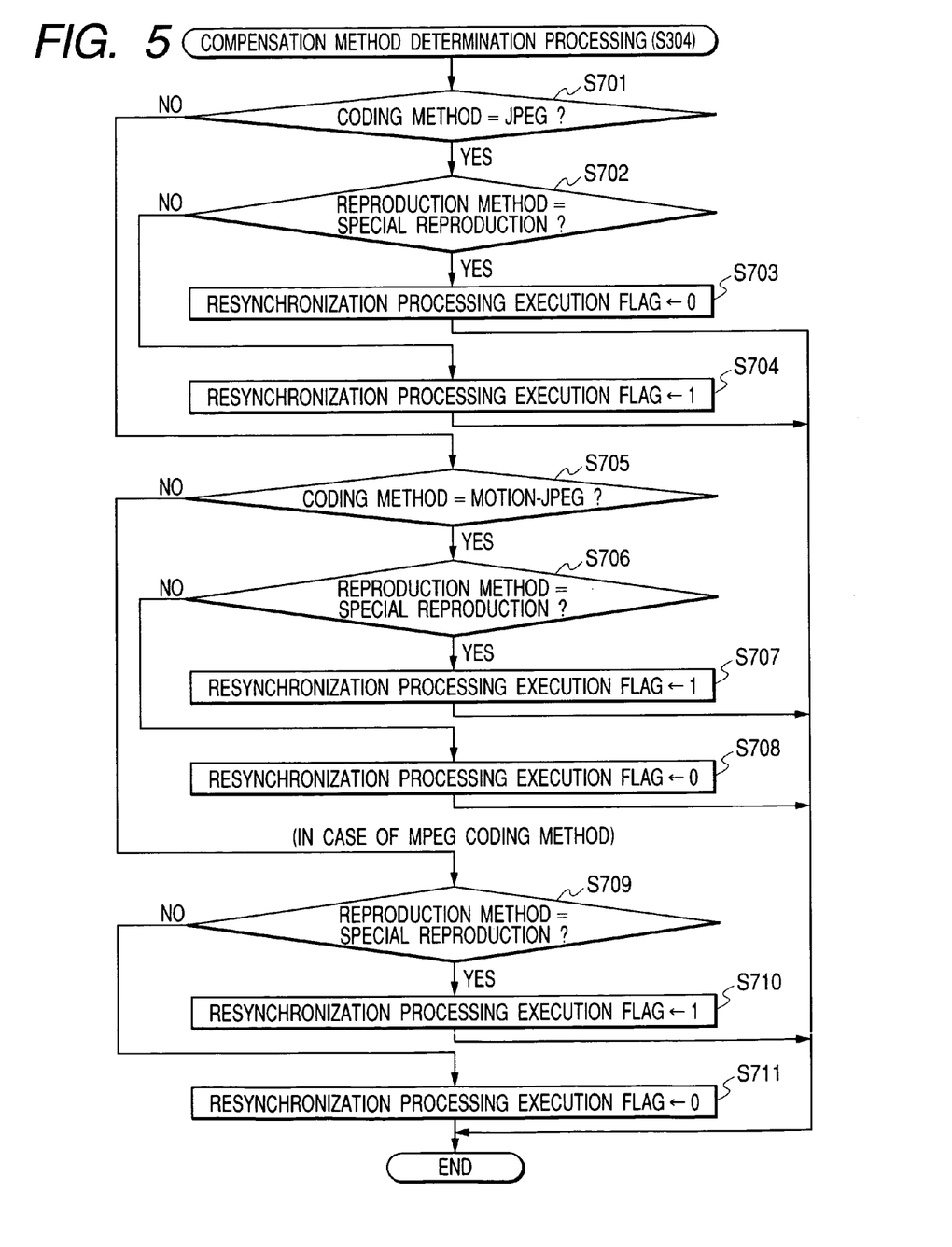
FIG. 5 is a flow chart showing a compensation method determining process in the header information process unit 101.

In the following there will be explained, with reference to a flow chart shown in FIG. 5, a compensation method determining process of the step S304 shown in FIG. 3.

At first there is discriminated whether or not the encoded data train 108 to be subjected to a decoding processing was encoded by the JPEG method (step S701).

In case the discrimination of the step S701 identifies that the subject encoded data train 108 is JPEG encoded, a reproduction method is further discriminated (step S702). In case the reproduction method under execution is a special reproduction such as for a high-speed display of plural still images on a display device of an equipment, a resynchronization process execution flag indicating execution of a resynchronization process is set at "0" (step S703), but the resynchronization process execution flag is set at "1" in case the special reproduction is not adopted (step S704).

On the other hand, in case the step S701 identifies that the encoded data train 108 to be decoded is not JPEG encoded, there is discriminated whether the encoding method is Motion JPEG (step S705). In case the discrimination of the step S705 identifies that the subject encoded code train 108 is the Motion JPEG encoded, a reproducing method is further discriminated (step S706). In case the reproduction method under execution is a special reproduction such as for a slow-motion reproduction in which each reconstructed image has a long display time, a resynchronization process execution flag indicating execution of a resynchronization process is set at "1" (step S707), but the resynchronization process execution flag is set at "0" in case such special reproduction is not adopted (step S708).

Further, in case the discrimination of the step S705 further identifies that the encoded data train 108 to be decoded is not Motion JPEG encoded, the encoding method in the present embodiment is identified as MPEG and there is further discriminated a reproducing method (step S709). In case the reproduction method under execution is a special reproduction such as for a slow-motion reproduction in which each reconstructed image has a long display time, a resynchronization process execution flag indicating execution of a resynchronization process is set at "1" (step S710), but the resynchronization process execution flag is set at "0" in case such special reproduction is not adopted (step S711).

Explanation of Compensation Data Output Process

In the following there will be explained, with reference to a flow chart in FIGS. 6A and 6B, a compensation data output process of the step S306 in FIG. 3.

At first there is discriminated whether or not the encoded data train 108 to be compensated is encoded by the JPEG method (step S501).

In case the discrimination of the step S501 identifies that the subject encoded data train 108 is not JPEG encoded, there is discriminated whether or not the encoded data train 108 to be compensated is encoded by the Motion JPEG method (step S502).

In case the discrimination of the step S501 identifies that the subject encoded data train 108 is Motion JPEG encoded, an MCU number corresponding to the encoded data train not yet decoded is set as an MCU count value (step S503).

As compensation data, using DC components of orthogonal transformation coefficients of an MCU normally decoded immediately before the detection of the code error, there is generated an MCU in which all the AC components of the orthogonal transformation coefficients are "0" (step S504).

This compensation data of one MCU are outputted to the variable length code decoding unit 102 in accordance with a compensation data write signal 106 (step S505).

Then the header information processing unit 101 subtracts "1" from the MCU count value and counts the remaining MCUs to be outputted (step S506).

The header information processing unit 101 repeatedly executes the above-explained compensation data output process until the MCU count value reaches "0", thereby outputting compensation data meeting the number of the horizontal pixels and that of the vertical pixels of the original image, to the variable length code decoding unit 102 (step S507).

All the compensation data outputted to the variable length code decoding unit 102 are outputted in succession to the image data reconstruction unit 110, as a sequence of orthogonal transformation coefficients (orthogonal transformation coefficient sequence output signal 109).

On the other hand, in case the steps S501 and S502 identify that the encoding method of the subject encoded data train 108 to be decoded is not JPEG nor Motion JPEG, the encoding method in the present embodiment is identified as MPEG, and a number of macroblocks, each having 16×16 pixels, corresponding to the encoded data train not yet decoded is set as a macroblock count value (step S508).

Then, in case a "picture_coding_type" in the image under processing is "intra_coded" (step S509), there is generated a macroblock which employs DC components of orthogonal transformation coefficients of a macroblock normally decoded immediately before the detection of the code error and in which all the AC components of the orthogonal transformation coefficients are "0" (step S510).

Also in case the "picture_coding_type" is not "intra_coded", the image is identified as an image based on an interframe prediction, and there is generated a header information "MC, Not-coded" indicating that a reference macroblock, positioned in a same coordinate position as that of the aforementioned macroblock and employed for prediction, is utilized as the compensation data (step S511).

The compensation data of a macroblock in either of the step S510 or the step S511 are outputted, by a compensation data write signal 106, to the variable length code decoding unit 102 (step S512).

Then the header information processing unit 101 subtracts "1" from the macroblock count value and counts the remaining macroblocks to be outputted (step S513).

The header information processing unit 101 repeatedly executes the above-explained compensation data output process until the macroblock count value reaches "0", thereby outputting compensation data meeting the number of the horizontal pixels and that of the vertical pixels of the original image, to the variable length code decoding unit 102 (step S514).

All the compensation data outputted to the variable length code decoding unit 102 are outputted in succession to the image data reconstruction unit 110, as a sequence of orthogonal transformation coefficients (orthogonal transformation coefficient sequence output signal 109).

Explanation on Resynchroning Process

Figure 7:
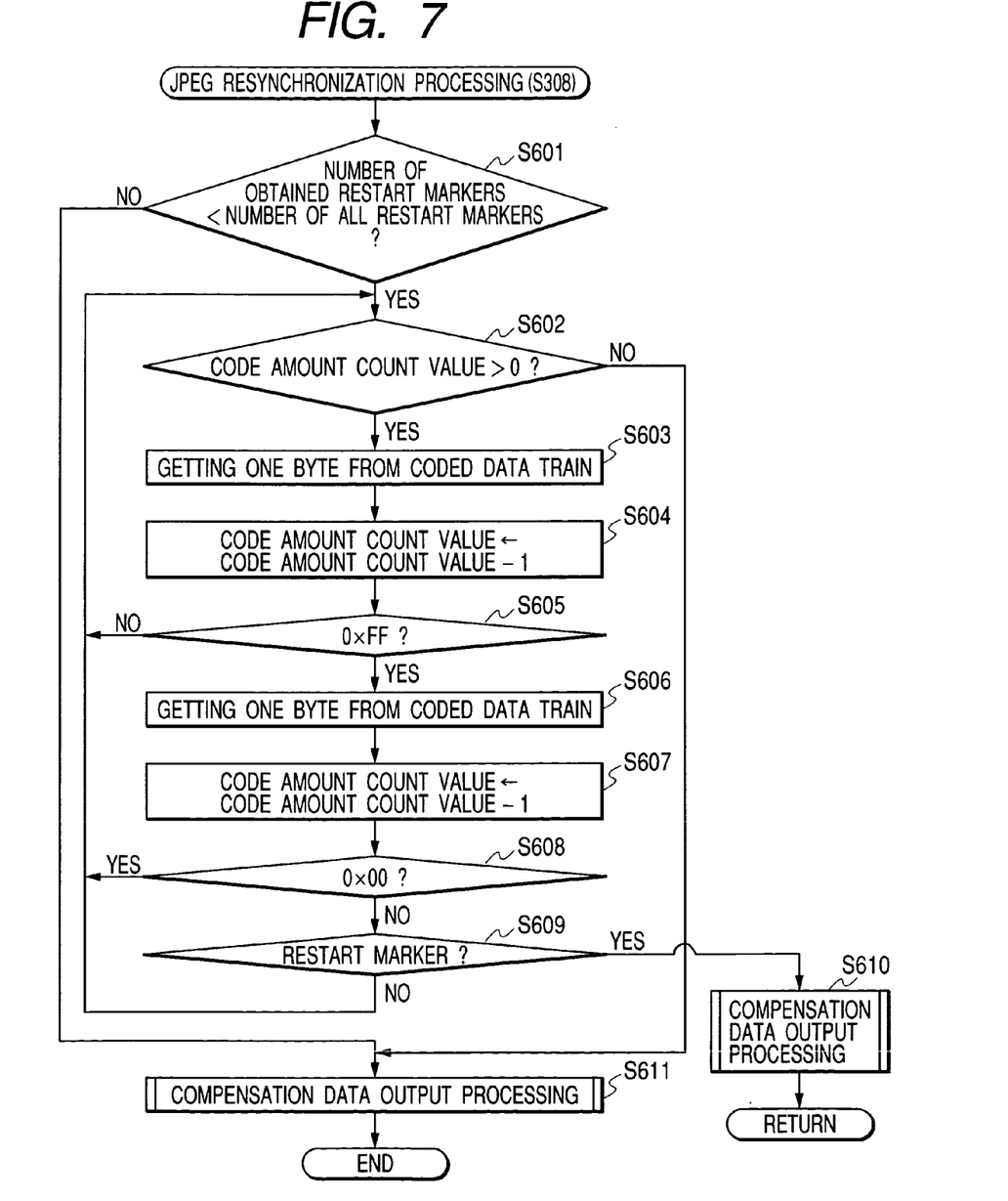
FIG. 7 is a flow chart showing a resynchronizing process in the header information process unit 101 for data encoded by a JPEG encoding method.
Figure 8:
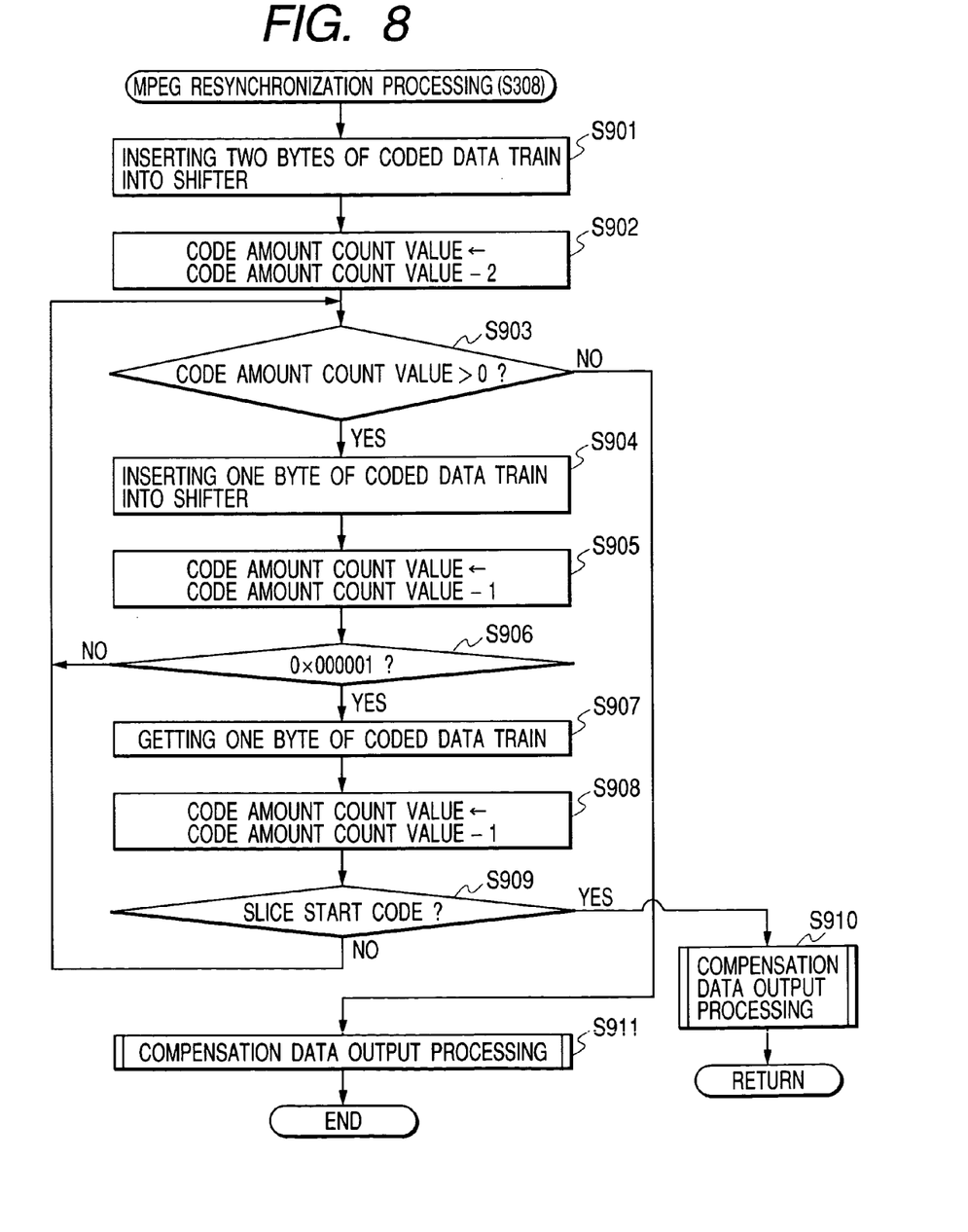
FIG. 8 is a flow chart showing a resynchronizing process in the header information process unit 101 for data encoded by an MPEG encoding method.

In the following there will be explained, with reference to flow charts shown in FIGS. 7 and 8, a resynchronizing process in the step S308 in FIG. 3.

At first there will be explained, with reference to FIG. 7, a resynchronizing process in case the subject encoded data train 108 to be subjected to an error compensation process is JPEG encoded.

The header information processing unit 101 compares a number of restart markers acquired until the position of detection of a code error with a total number of the restart markers in the encoded data train 108 (step S601), and, in case the former is not smaller than the latter, namely in case all the restart markers are found, a compensation data output process is executed immediately (step S611, cf. FIGS. 6A and 6B), whereupon the resynchronizing process is terminated.

In case the comparison in the step S601 identifies that the former is smaller than the latter, namely that the presence of a restart marker can still be expected in the encoded data train 108, the header information processing unit 101 discriminates whether a code amount count value is equal to or less than "0", and in case the discrimination identifies that the code amount count value is equal to or less than "0", a compensation data output process is executed immediately (step S610), whereupon the resynchronizing process is terminated.

In case the steps S601 and S602 identify that the presence of a restart marker can be expected in the encoded data train 108 and that the code amount count value is larger than "0", the header information processing unit 101 executes a following process starting from a step S603.

At first the header information processing unit 101 acquires encoded data of 1 byte (encoded data output signal 107) from the variable length code decoding unit 102 (step S603).

Then the header information processing unit 101 subtracts "1" from the code amount count value and counts a code amount of the unprocessed encoded data train (step S604).

In case the image employs, for example, the JPEG encoding method, all the markers start with a 1-byte data "0xFF" in hexadecimal representation.

Therefore, the header information processing unit 101 discriminates whether or not the acquired 1-byte encoded data are "0xFF" (step S605), and, if not, continues the acquisition of the encoded data from the variable length code decoding unit 102 until encoded data "0xFF" are found.

In case 1-byte encoded data "0xFF" appears in the step S605, the header information processing unit 101 acquires a next byte (step S606), then subtracts "1" from the code amount count value and count the code amount of the unprocessed encoded data train (step S611). Then it discriminates whether or not a start marker exists on the basis of a value obtained in the step S606 (step S608).

For example, in case the JPEG encoding method is employed for encoding the image and a variable length code "0xFF" appears at the boundary of bytes, a code "0x00" is inserted immediately thereafter so that a marker can be identified.

Therefore, in case the steps S606 and S607 identify that a byte acquired after "0xFF" is "0x00", the header information processing unit 101 repeats an operation of searching "0xFF" in the encoded data train 108.

Also in the JPEG encoding method, the restart markers has 8 values from "0xFFD0" to "0xFFD7" in succession. After reaching a value "0xFFD7", the markers again has these values in succession from the value "0xFFD0".

As an example, in case a restart marker "0xFFD2" appears immediately before the detection of a code error, a restart marker that should appear next is "0xFFD3". After a code error is detected once, it is unpredictable whether or not the restart marker appears, because it depends on the level of damage in the encoded data train. But any appearing marker that is not a restart marker is considered an improper marker generated by a damage given to the encoded data train.

Therefore the header information processing unit 101 repeats an operation of searching "0xFF" in the encoded data train 108 (step S609).

Figure 6:
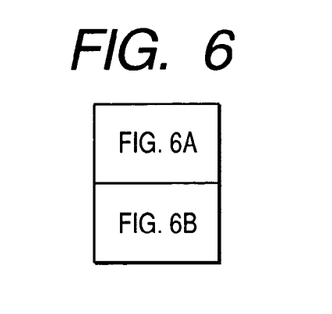
FIG. 6 is comprised of FIGS. 6A and 6B showing flow charts illustrating a compensation data output process in the header information process unit 101.
Figure 6A:
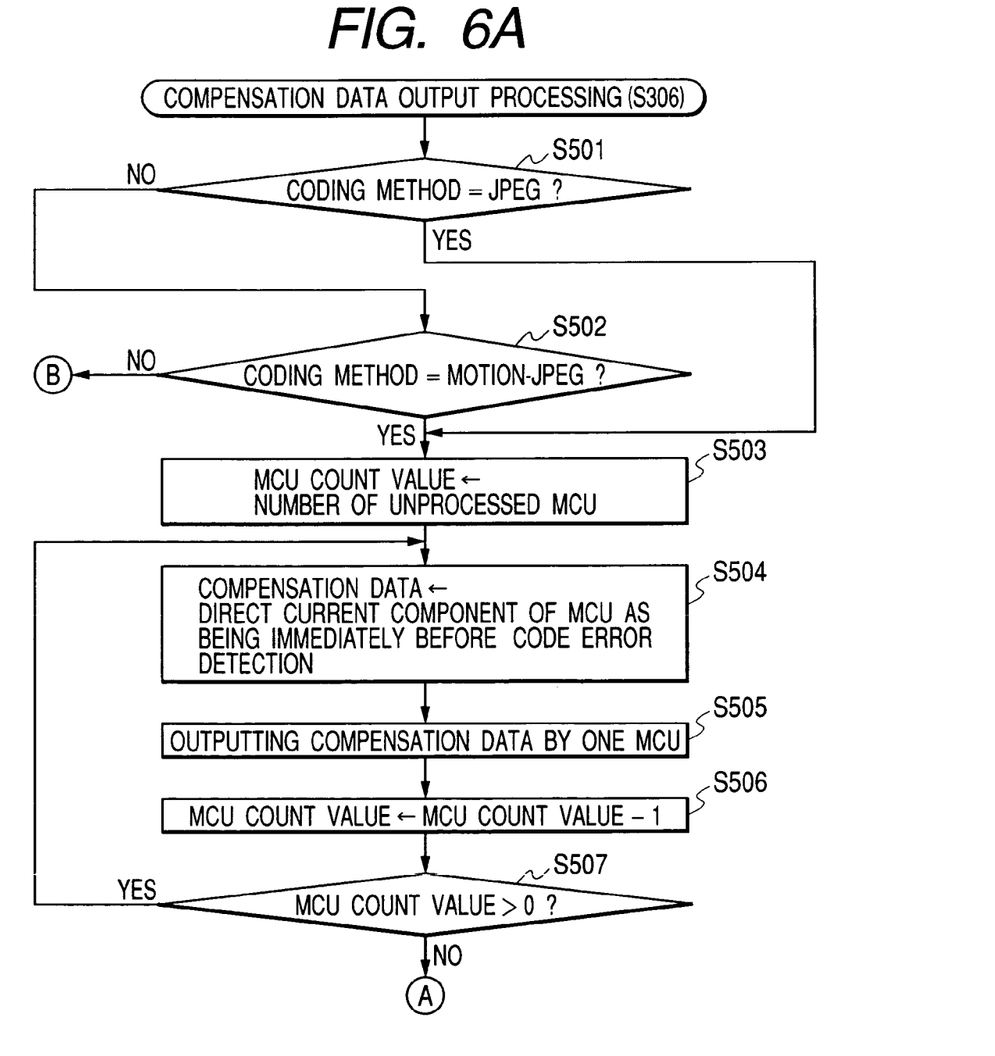
Figure 6B:
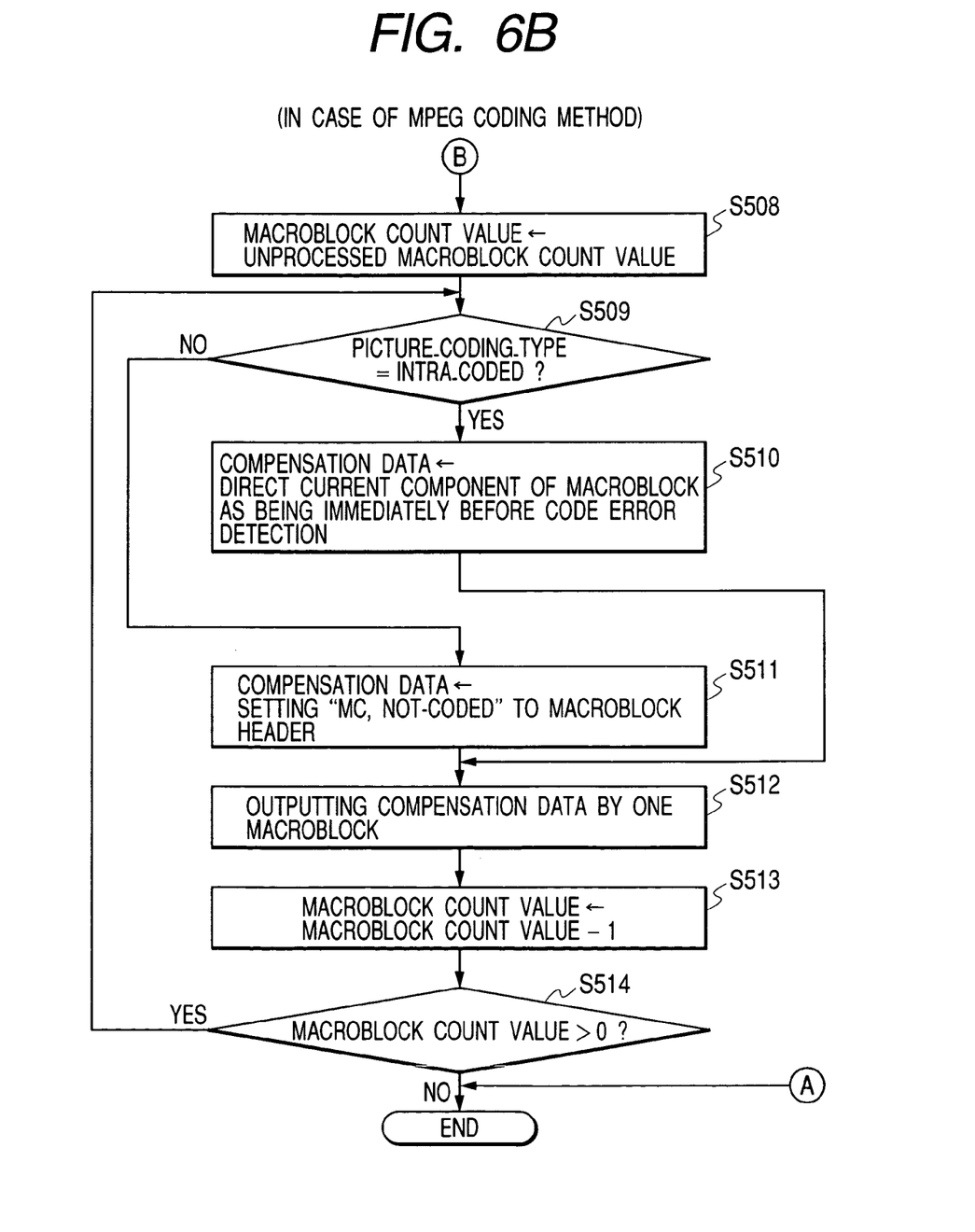

In case any restart marker appears in such searching operation for "0xFF", the header information processing unit 101 immediately executes a compensation data output process (step S610: cf. FIGS. 6A and 6B).

Figure 3:
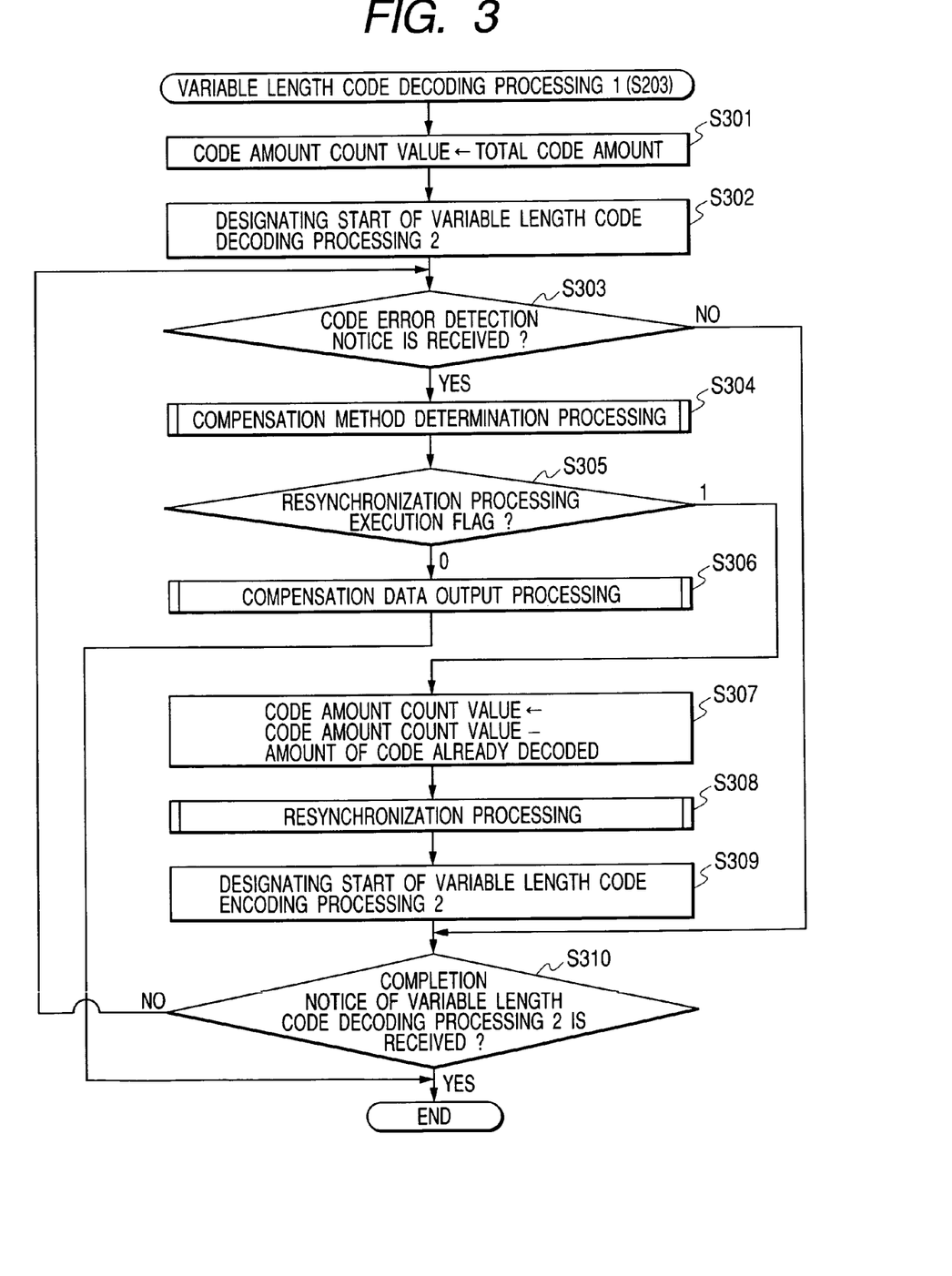
FIG. 3 is a flow chart showing a decoding process 1 for a variable length code in a header information process unit 101.
Figure 4:
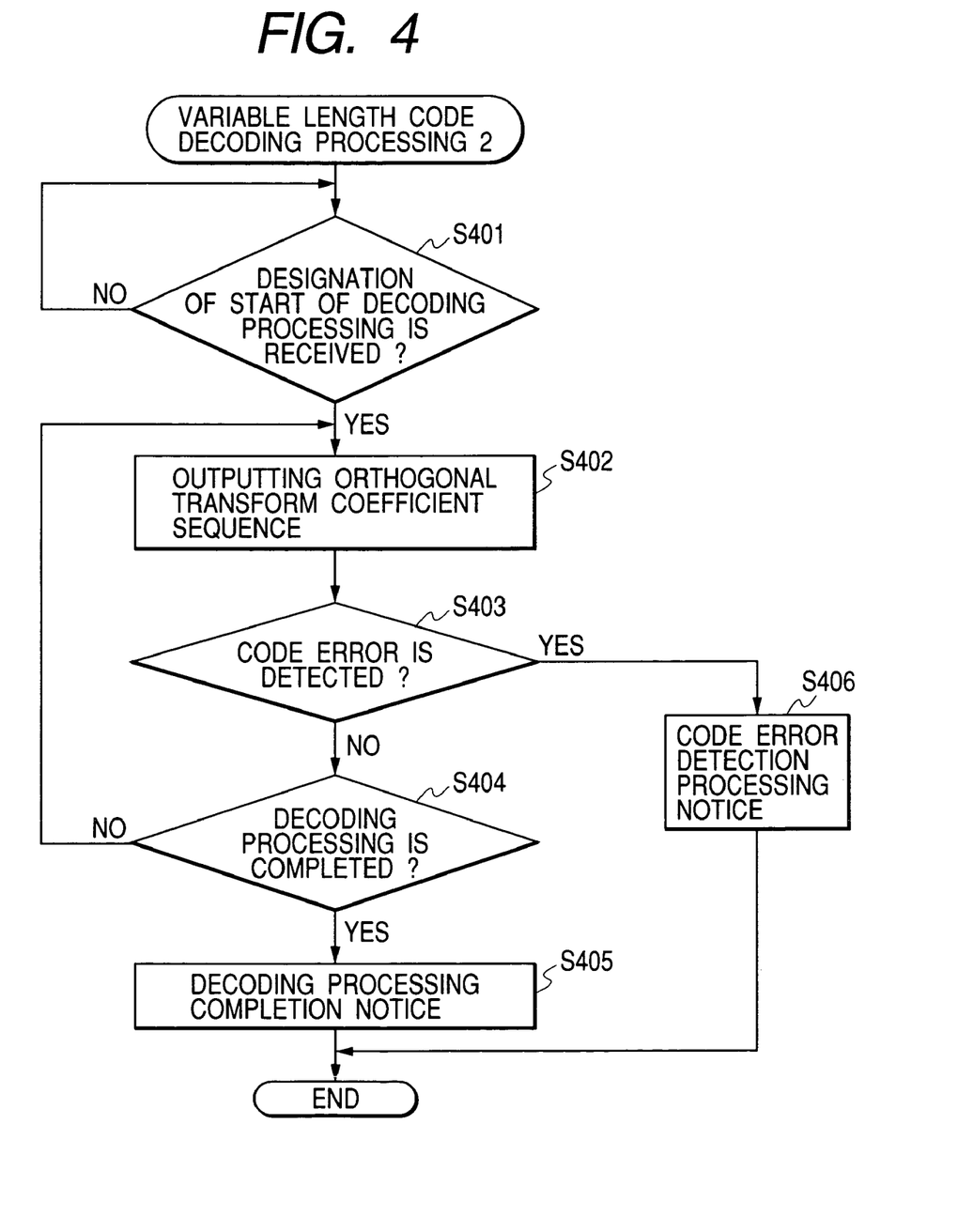
FIG. 4 is a flow chart showing a decoding process 2 for a variable length code in a header information process unit 101.

In the compensation data output process, the header information processing unit 101 outputs compensation data corresponding to a loss estimated from a difference between a value of a restart marker found immediately before the detection of the code error and a value of a restart marker found in the search for the restart marker, and then proceeds to a step S309 in FIG. 3.

In the foregoing, the resynchronizing process has been explained in case the encoded data train 108 to be subjected to the compensation process is JPEG-encoded, but a similar resynchronizing process is applicable also in case the Motion JPEG method is employed for encoding. Also in case the MPEG method is employed for encoding, a resynchronizing process of a same principle can be executed employing a Slice_Start_Code of a slice header instead of the restart marker, though the details will not be explained further.

In the following there will be explained, with reference to a flow chart shown in FIG. 8, a resynchronizing process in case the encoded data train 108 to be subjected to the error compensation process is MPEG encoded.

At first the header information processing unit 101 acquires 2 bytes in the encoded data train, and inserts these 2 bytes into a shifter of a length of 3 bytes from an LSB side thereof (step S901). This 3 byte shifter is so constructed as to discard data of 1 byte from the MSB side upon insertion of data of 1 byte from the LSB side. Then the header information processing unit 101 subtracts "2" from the code amount count value and counts a code amount of the unprocessed encoded data train (step S902).

Then the header information processing unit 101 discriminates whether the code amount count value is larger than "0", and if it is equal to or less than "0", there is immediately executed all the compensation data output processes for reconstructing the pixels in the horizontal and vertical directions of the subject picture of decoding (step S911; similar to FIG. 6) whereupon the resynchronizing process is terminated. On the other hand, in case the code amount count value is larger than "0", the header information processing unit 101 proceeds to a next step S904 (step S903).

At first the header information processing unit 101 acquires encoded data of 1 byte (encoded data output signal 107) from the variable length code decoding unit 102, and inserts this byte into a shifter of a length of 3 bytes from an LSB side thereof (step S904). Then the header information processing unit 101 subtracts "1" from the code amount count value and counts a code amount of the unprocessed encoded data train (step S905).

In case the MPEG encoding method is employed for image encoding, a slice start code utilized for resynchronization starts with a 3-byte data "0x000001" in hexadecimal representation. Thus the header information processing unit 101 discriminates whether or not the encoded data of 3 bytes in total, which have been inserted into the 3-byte shifter, are "0x000001" (step S906), and, if not "0x000001", there is continued the acquisition of the encoded data from the variable length code decoding unit 102 until encoded data "0x00000" appear.

On the other hand, in case the step S906 identifies the presence of 3-byte encoded data "0x000001", the header information processing unit 101 further acquires next 1 byte (step S907), subtracts "1" from the code amount count value and counts a code amount of the unprocessed encoded data train (step S908).

Then it is discriminated whether or not 1 byte acquired in the step S907 is a slice start code (step S909). In order to be a slice start code, the acquired byte is required to have a value within a range of "0x01 to AF". For example, in case a slice start code appearing immediately before the detection of the code error is "0x000002", a next slice start code should be "0x000003".

After a code error is once detected, it is unpredictable whether or not the slice start code appears, because it depends on the level of damage in the encoded data train. But in case any start code that is not any slice start code appears in the course of decoding of a picture, such start code is considered an improper marker generated by a damage given to the encoded data train.

Thus the header information processing unit 101 repeats an operation of searching a pattern "0x000001" in the encoded data train 108 (step S909).

In case the step S909 detects any slice start code, the header information processing unit 101 immediately executes a compensation data output process (step S910; cf. FIGS. 6A and 6B). In the compensation data output process, the header information processing unit 101 outputs compensation data corresponding to a loss estimated from a difference between a value of a slice start code found immediately before the detection of the code error and a value of a slice start code found in the search for the slice start code, and then proceeds to a step S309 in FIG. 3.

In a decoding process of a still image for example encoded by the JPEG encoding method, as explained in the foregoing embodiment, priority is often given to the formation of a reconstruction image faithful to the original image, so that the code error compensation process including the aforementioned resynchronizing process (cf. FIGS. 7 and 8) is positively adopted even if there is required a longer process time than in the ordinary decoding process.

On the other hand, in a decoding process for a moving image obtained for example by Motion JPEG encoding method or MPEG method, the process time permitted for the decoding process is limited since it is required to decode, within 1 second, about 30 images in succession. Also in case of decoding and displaying a moving image, a visual defect to the user is limited even in case one of the consecutive plural images contains certain code errors. Furthermore, even in case one of the consecutive plural images is not usable because of code errors, it is possible to interpolate such image from images positioned time-sequentially close.

Therefore, in a moving image decoding process, even in case an encoded data train includes a code error, it is desired that the error compensation process is completed within a process time comparable to that in the ordinary decoding process, so that the aforementioned resynchronizing process (cf. FIGS. 7 and 8) is not executed.

Also in a decoding process of a still image for example by the JPEG encoding method, in case the reproduction method under execution is a special reproduction such as a high-speed display of plural still images on a display device of an equipment, it is desired to promptly complete the error compensation process even in the presence of a code error in the encoded data train, so that the aforementioned resynchronizing process (cf. FIGS. 7 and 8) is not executed.

Also in a decoding process for a moving image obtained for example by Motion JPEG encoding method or MPEG method, in case the reproduction method under execution is a special reproduction such as for a slow-motion reproduction in which each reconstructed image has a long display time, priority is given to the formation of a reconstruction image faithful to the original image, so that the code error compensation process including the aforementioned resynchronizing process (cf. FIGS. 7 and 8) is positively adopted.

It is therefore extremely reasonable, for the convenience of the user, to adopt a configuration of the present embodiment capable of switching the error compensation process according to the encoding method of a still image or a moving image such as the JPEG, Motion JPEG or MPEG encoding method and also according to the reproducing method in each encoding method.

The present embodiment is so constructed as to employ the JPEG encoding method for encoding a still image, but the present invention is likewise applicable to any other encoding method.

Also the present embodiment is so constructed as to employ the Motion JPEG and MPEG encoding methods for encoding a moving image, but the present invention is likewise applicable to any other encoding method.

The present invention may be applied to a system consisting of plural equipment (for example host computer, interface devices, reader, printer etc.) or an apparatus consisting of a single equipment (such as a copying machine or a facsimile apparatus).

Also the objects of the present invention can naturally be attained in a case where a memory medium storing the program codes of a software realizing the functions of the host and terminal of the aforementioned embodiment is supplied to a system or an apparatus and the computer (CPU or MPU) of the above-mentioned system or apparatus reads and executes the program codes stored in the memory medium.

In such case the program codes themselves read from the memory medium realize the functions of the aforementioned embodiments, and the memory medium storing such program codes and the program codes themselves constitutes the present invention.

The memory medium for supplying such program codes can be, for example, a ROM, a flexible disk, a hard disk, an optical disk, a magnetooptical disk, a CD-ROM, a CD-R, a magnetic tape, or a non-volatile memory card.

The present invention also includes not only a case where the functions of the aforementioned embodiment are realized by the execution of the read program codes by the computer but also a case where an operating system or the like functioning on the computer executes all or a part of the actual processes under the control of such program codes thereby realizing the functions of the aforementioned embodiment.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

Figure 9:
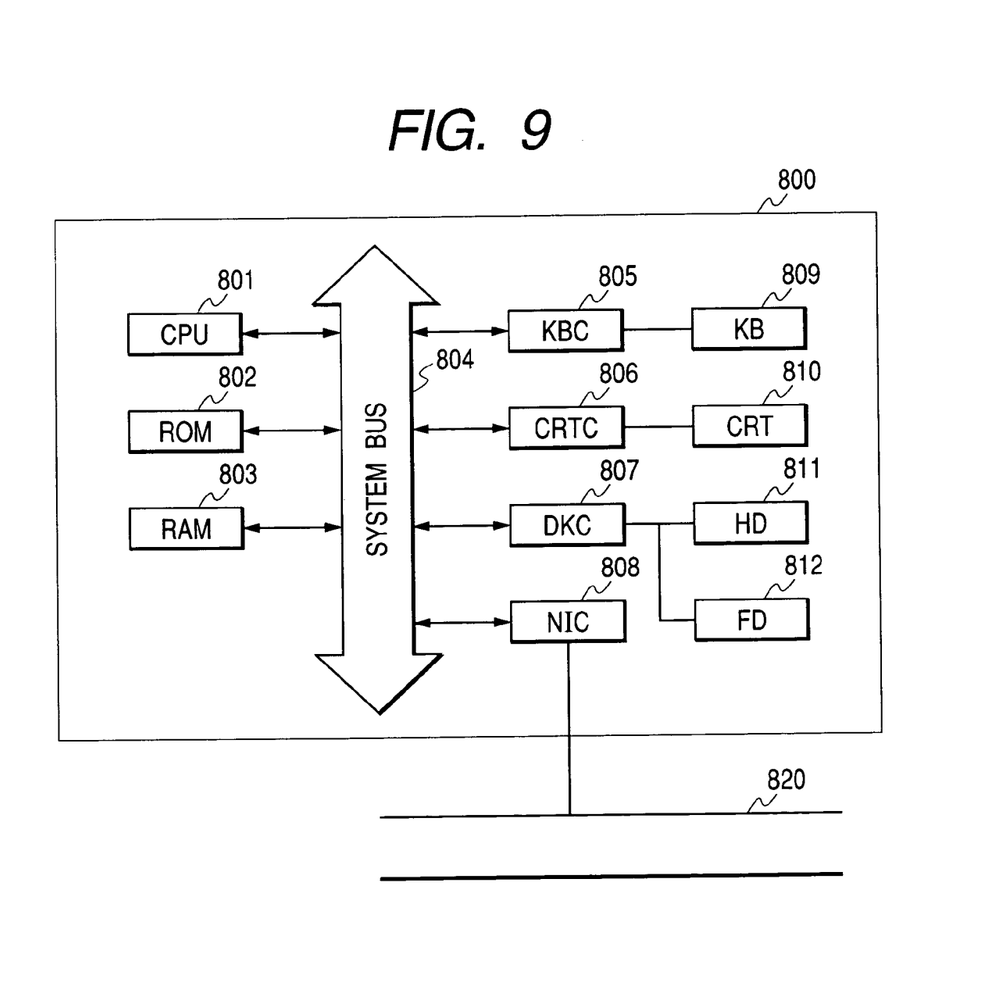
FIG. 9 is a block diagram showing a configuration of a computer which reads, from a computer readable memory medium, and executes a program for causing the computer to realize a function of an image processing apparatus embodying the present invention.

FIG. 9 shows a function 800 of the aforementioned computer.

The computer function 800 is composed, as shown in FIG. 9, of a CPU 801, a ROM 802, a RAM 803, a keyboard controller (KBC) 805 for a keyboard (KB) 809, a CRT controller (CRTC) 806 for a CRT display (CRT) 810 constituting a display unit, a disk controller (DKC) 807 for a hard disk (HD) 811 and a flexible disk (FD) 821, and a network interface controller (NIC) 808 for connection with a network 820, connected in mutually communicable manner through a system bus 804.

The CPU 801 integrally controls various components connected to the system but 804 by executing a software stored in the ROM 802 or the HD 811 or a software supplied from the FD 812.

More specifically, the CPU 801 reads a process program of a predetermined process sequence from the ROM 802, the HD 811 or the FD 812 and executes such program thereby realizing the functions of the present embodiment.

The RAM 803 functions as a main memory or a work area of the CPU 801. The KBC 805 controls an instruction input from the KB 809 and an unrepresented pointing device.

The CRTC 806 controls a display on the CRT 810.

The DKC 807 controls access to the HD 811 and the FD 812 storing a boot program, various applications, an editing file, a user file, a network management program and a predetermined process program in the present embodiment.

The NIC 808 executes bidirectional data exchange with the apparatus or the system on the network 820.

In other words, the foregoing description of embodiments has been given for illustrative purposes only and to to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) an input unit arranged to input encoded image data, wherein the encoded image data includes a marker code for a resynchronizing process within one picture;
   b) a detection unit arranged to detect a code error in the encoded image data; and
   c) an error compensation unit arranged to execute an error compensation process on the encoded image data on the basis of a result of detection by said detection unit, wherein said error compensation unit discriminates whether or not to execute the error compensation process utilizing the marker code according to an attribute of the encoded image data.

2. An apparatus according to claim 1, wherein the attribute of the encoded image data indicates whether the encoded image data is a still image or a moving image.

3. An apparatus according to claim 1, wherein the attribute of the encoded image data indicates an encoding method employed in an encoding process of the encoded image data.

4. An apparatus according to claim 3, wherein the encoding method is one of a plurality of encoding methods including a JPEG encoding method and an MPEG encoding method.

5. An apparatus according to claim 1, wherein the attribute of the encoded image data indicates a reproducing method of reproducing the encoded image data, and the reproducing method is one of a plurality of reproducing methods including a special reproduction method and a normal reproduction method.

6. An apparatus according to claim 1, further comprising:
   a decoding unit arranged to decode the encoded image data.

7. An apparatus according to claim 1, wherein said error compensation unit selects, according to the attribute of the encoded image data, a first process mode for compensating the encoded image data within one picture after occurrence of a code error, and a second process mode for compensating the encoded image data until a detection of the marker code after occurrence of the code error.

8. An image processing method comprising:
   a) an input step of inputting encoded image data, wherein the encoded image data includes a marker code for a resynchronizing process within one picture;
   b) a detection step of detecting a code error in the encoded image data; and
   c) an error compensation step of executing an error compensation process on the encoded image data on the basis of a result of detection in said detection step, wherein said error compensation step includes discriminating whether or not to execute the error compensation process utilizing the marker code according to an attribute of the encoded image data.

9. A method according to claim 8, wherein the attribute of the encoded image data indicates whether the encoded image data is a still image or a moving image.

10. A method according to claim 8, wherein the attribute of the encoded image data indicates an encoding method employed in an encoding process of the encoded image data.

11. A method according to claim 8, wherein the encoding method is one of a plurality of encoding methods including a JPEG encoding method and an MPEG encoding method.

12. A method according to claim 8, wherein the attribute of the encoded image data indicates a reproducing method of reproducing the encoded image data, and the reproducing method is one of a plurality of reproducing methods including a special reproduction method and a normal reproduction method.

13. A program for causing a computer to execute steps constituting the image processing method according to claim 8.

14. A recording medium storing a program for causing a computer to execute steps constituting the image processing method according to claim 8.

* * * * *

UNITED STATES PATENT AND TRADEMARK OFFICE
CERTIFICATE OF CORRECTION

PATENT NO. : 7,185,264 B2  
APPLICATION NO. : 10/642231  
DATED : February 27, 2007  
INVENTOR(S) : Yukio Chiba Page 1 of 1

It is certified that error appears in the above-identified patent and that said Letters Patent is hereby corrected as shown below:

<u>COLUMN 11</u>

Line 16, "0x00000" should read -- 0 x 000001 --.

Signed and Sealed this

Ninth Day of September, 2008

JON W. DUDAS  
*Director of the United States Patent and Trademark Office*